United States Patent
Kakish

(10) Patent No.: US 9,672,183 B2
(45) Date of Patent: Jun. 6, 2017

(54) INTEGRATION OF DOWNSTREAM PORTS IN A MULTIPLE INTERFACE DEVICE

(71) Applicant: Western Digital Technologies, Inc., Irvine, CA (US)

(72) Inventor: Musa I. Kakish, Anaheim, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 7 days.

(21) Appl. No.: 14/557,148

(22) Filed: Dec. 1, 2014

(65) Prior Publication Data

US 2016/0154759 A1  Jun. 2, 2016

(51) Int. Cl.
G06F 13/00 (2006.01)
G06F 13/38 (2006.01)
G06F 13/40 (2006.01)
G06F 13/10 (2006.01)

(52) U.S. Cl.
CPC .......... *G06F 13/4068* (2013.01); *G06F 13/10* (2013.01)

(58) Field of Classification Search
None
See application file for complete search history.

(56) References Cited

U.S. PATENT DOCUMENTS

| | | | |
|---|---|---|---|
| 7,701,705 B1 | 4/2010 | Szeremeta | |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |
| 8,547,658 B1 | 10/2013 | Szeremeta | |
| 8,706,944 B2 | 4/2014 | Song et al. | |
| 2003/0177294 A1 | 9/2003 | Russell | |
| 2006/0059293 A1 | 3/2006 | Wurzburg et al. | |
| 2007/0245058 A1 | 10/2007 | Wurzburg et al. | |
| 2008/0065796 A1 | 3/2008 | Lee et al. | |
| 2010/0077079 A1 | 3/2010 | Xu et al. | |
| 2012/0166691 A1* | 6/2012 | Song | G06F 13/387 710/105 |
| 2012/0265918 A1 | 10/2012 | Nakajima et al. | |
| 2012/0265919 A1 | 10/2012 | Jono et al. | |
| 2013/0145071 A1* | 6/2013 | Chu | G06F 13/385 710/313 |
| 2013/0324191 A1* | 12/2013 | Chen | H04M 1/7253 455/557 |

(Continued)

OTHER PUBLICATIONS

International Search Report and Written Opinion dated Mar. 31, 2016 from PCT Serial No. PCT/US2015/061241, 18 pages.

*Primary Examiner* — David E Martinez

(57) ABSTRACT

One aspect of a multiple data type interface device can include a plurality of upstream ports, wherein at least two of the upstream ports are of a different type, a plurality of downstream ports, wherein at least one of the plurality of downstream ports is configured to connect to an external device, and one or more processors configured to detect a connection at one of the plurality of upstream ports, and route an upstream port signal associated with one of the plurality of upstream ports to the at least one of the plurality of downstream ports configured to connect to the external device when the connection is detected at the one of the plurality of upstream.

24 Claims, 3 Drawing Sheets

(56) References Cited

U.S. PATENT DOCUMENTS

2014/0075065 A1* 3/2014 Haeffner .............. G06F 3/0689
710/74
2015/0331618 A1* 11/2015 Farrell .................... G11B 5/86
711/115

* cited by examiner

INTEGRATION OF DOWNSTREAM PORTS IN A MULTIPLE INTERFACE DEVICE

BACKGROUND

An external hard drive can be configured with multiple upstream interfaces that can make it convenient for a user to choose between any interfaces from his/her host computing device to run a data transfer.

DETAILED DESCRIPTION

Figure 1:
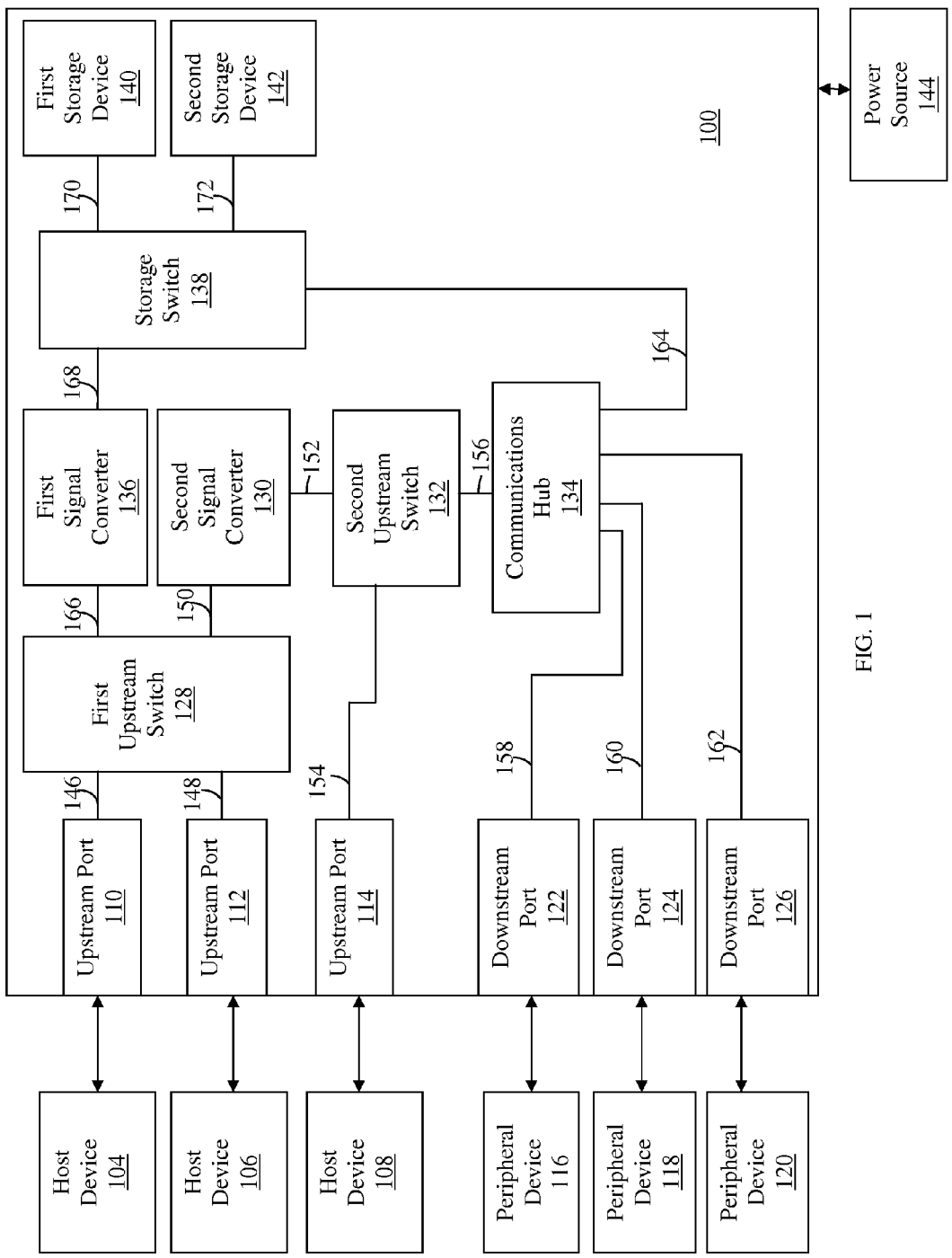
FIG. 1 is a diagram illustrating an exemplary embodiment of a multiple interface device.

The detailed description set forth below in connection with the appended drawings is intended as a description of various exemplary embodiments of the present disclosure and is not intended to represent the only embodiments in which the present disclosure may be practiced. The detailed description includes specific details for the purpose of providing a thorough understanding of the present disclosure. However, it will be apparent to those skilled in the art that the present disclosure may be practiced without these specific details. In some instances, well-known structures and components are shown in block diagram form in order to avoid obscuring the concepts of the present disclosure.

The word "exemplary" is used herein to mean serving as an example, instance, or illustration. Any embodiment described herein as "exemplary" is not necessarily to be construed as preferred or advantageous over other embodiments. Likewise, the term "embodiment" of a device or method does not require that all embodiments of the disclosure include the described components, structure, features, functionality, processes, advantages, benefits, or modes of operation.

In the following detailed description, various aspects of a multiple interface device will be presented. These aspects of a multiple interface device are well suited for enabling a user to choose between any interfaces from his/her computing device to run a data transfer and at the same time providing flexibility to make downstream ports of the multiple interface device act as an expansion for storage or to provide a docking function by having the convenience of peripheral devices that connect to a downstream port of the multiple interface device or are integrated internally inside a housing of the multiple interface device. Those skilled in the art will realize that these aspects may be extended to all types of media storage devices including, but not limited to, an external hard drive, a laptop computer, a personal computer (PC), a smart phone, a tablet device, a personal digital assistant, or a compound device. Accordingly, any reference to a specific device is intended only to illustrate the various aspects of the present disclosure, with the understanding that such aspects may have a wide range of applications.

One aspect of a multiple data type interface device includes a plurality of upstream ports, wherein at least two of the upstream ports are of a different type, a plurality of downstream ports, wherein at least one of the plurality of downstream ports is configured to connect to an external device, and one or more processors configured to detect a connection at one of the plurality of upstream ports, and route an upstream port signal associated with the one of the plurality of upstream ports to the at least one of the plurality of downstream ports configured to connect to the external device when the connection is detected at the one of the plurality of upstream ports.

One aspect of a method for switching between interfaces of a multiple data type interface device includes detecting a connection at one of a plurality of upstream ports, wherein at least two of the plurality of upstream ports are of a different type, and routing an upstream port signal associated with the one of the plurality of upstream ports to at least one of a plurality of downstream ports connected to an external device.

It will be understood that other aspects of the present disclosure will become readily apparent to those skilled in the art from the following detailed description, wherein it is shown and described only several embodiments of the disclosure by way of illustration. As will be realized by those skilled in the art, the present disclosure is capable of other and different embodiments and its several details are capable of modification in various other respects, all without departing from the spirit and scope of the disclosure.

FIG. 1 is a diagram illustrating an exemplary embodiment of a multiple interface device 100 configured to connect to at least one host device at one or more upstream ports and at least one peripheral device at one or more downstream ports. For example, the multiple interface device can include an external hard drive, a laptop computer, a personal computer (PC), a smart phone, a tablet device, a personal digital assistant, or a compound device, just to name a few. With reference to FIG. 1, the multiple interface device 100 can be connected to a power source 144 (e.g., a wall outlet alternating current source). Further, the multiple interface device 100 can include a plurality of upstream ports 110, 112, and 114 located upstream of communications hub 134. Each of upstream ports 110, 112, and 114 can be configured to couple to respective host devices 104, 106, and 108. In an exemplary embodiment, upstream ports 110 and 112 can be of a first type, while upstream port 114 can be of a second type. For example, upstream ports 110 and 112 can each be a Thunderbolt™ type port and upstream port 114 can be a USB B-type 3.0 port. Alternately, upstream ports 110, 112, and 114 can include one or more of a FireWire™ type port (e.g., an IEEE 1394 interface), a data visual interface, a Displayport™, an external serial advanced technology attachment (eSATA) port, a PS/2 port, a serial port, a video graphics array (VGA) port, a small computer system interface (SCSI) port, a high-definition multimedia interface (HDMI), and/or an audio port. Host devices 104, 106, and 108 configured to connect to the respective upstream ports 110, 112, 114 can include, for example, an external hard drive, a laptop computer, a personal computer (PC), a smart phone, a tablet device, a personal digital assistant, or a compound device, just to name a few.

Still referring to FIG. 1, the multiple interface device 100 can also include a plurality of downstream ports 122, 124, and 126 located downstream of communications hub 134. In an exemplary embodiment, downstream ports 122, 124, and 126 can each be of the same type. For example, downstream ports 122, 124, and 126 can each be a USB A-type 3.0 port. Alternately, downstream ports 122, 124, and 126 can include one or more of a FireWire™ port (e.g., an IEEE 1394 interface), a data visual interface, a Displayport™, an external serial advanced technology attachment (eSATA) port, a PS/2 port, a serial port, a video graphics array (VGA) port, a small computer system interface (SCSI) port, a high-definition multimedia interface (HDMI), and/or an audio port. Each of downstream ports 122, 124, and 126 can be respectively connected to peripheral device 116, 118, and 120. Peripheral devices 116, 118, and 120 can include, for example, a mouse, a keyboard, an external hard drive, a laptop computer, a personal computer (PC), a smart phone, a tablet device, a personal digital assistant, or a compound device, just to name a few.

In an exemplary embodiment, upstream ports 110 and 112 are each a Thunderbolt™ type port, which are respectively connected to a first upstream switch 128 via signal lines 146 and 148. The first upstream switch 128 can direct upstream port signals from Thunderbolt™ upstream ports 110 and 112 to a first signal converter 136 or a second signal converter 130 via signal lines 166 and 150, respectively. In an exemplary embodiment, the first signal converter 136 can be configured to convert upstream signals being routed to either of the first storage device 140 or the second storage device 142 from a peripheral component interconnect express (PCIe) signal standard to an external serial advanced technology attachment (eSATA) signal standard. The upstream signal converted to the eSATA standard can then be sent to a storage switch 138 via signal line 168. In an exemplary embodiment, the storage switch 138 can be a 1:2 demultiplexer that is configured to send the received eSATA signal to either the first storage device 140 or the second storage device 142 via signal lines 170 and 172, respectively. The first storage device 140 and the second storage device 142 can each be an internal hard drive of the multiple interface device 100. Although two storage devices 140, 142 are illustrated in FIG. 1, it is understood that a single storage device or more than two storage devices may be included in the multiple interface device 100 without departing from the scope of the present disclosure.

With further reference to FIG. 1, the second signal converter 130 can convert upstream signals received from the first upstream switch 128 from a peripheral component interconnect express (PCIe) signal standard to a universal serial bus (USB) signal standard. In an exemplary embodiment, the second signal converter can be a USB extensible host controller interface (xHCI). The converted upstream signals can then be sent through the second upstream switch 132 to the communications hub 134, which can route the converted upstream signals to the appropriate downstream port. In an exemplary embodiment, the second upstream switch 132 can be a 2:1 multiplexer that selects either input line 152 or 154 for sending upstream data to the communications hub 134 via signal line 156. In an exemplary embodiment, the communications hub 134 can include a USB hub that enables signal line 156 to connect to downstream ports 122, 124, and 126 via signal lines 158, 160, and 162, respectively. Downstream ports 122, 124, and 126 can each be a USB A-type port, according to an exemplary embodiment, that are configured to respectively connect to external peripheral devices 116, 118, and 120. The external peripheral devices 116, 118, and 120 can include any type of device that can be configured to connect to a USB A-type connector. For example, the external peripheral devices 116, 118, and 120 can include a keyboard, a mouse, a laptop computer, a personal computer (PC), a smart phone, a tablet device, a personal digital assistant, or a compound device.

Still referring to FIG. 1, upstream port 114 can be a different type of port than upstream ports 110 and 112, according to an exemplary embodiment. For example, upstream port 114 can be a USB B-type port. In an exemplary embodiment, signals routed between USB B-type upstream port 114 and USB A-type downstream ports 122, 124, and 126 via the second upstream switch 132 and communications hub 134 do not need to be converted to a different signal standard since the USB B-type upstream port 114 and the USB A-type downstream ports 122, 124, and 126 communicate using the same signal standard (i.e., a USB signal standard). Signals from the USB B-type upstream port 114 intended for one of the first storage device 140 or the second storage device 142 can also be routed through the communications hub 134. In an exemplary embodiment, a signal routed from the USB B-type upstream port 114 to one of the first storage device 140 or the second storage device 142 may not need to be converted to a different signal standard. Alternately, if a signal routed from the USB B-type upstream port 114 does need to be converted to a different signal standard a third signal converter (not shown in FIG. 1) may be included between the communications hub 134 and the storage switch 138. Moreover, the storage switch 138 may be able to directly provide signal conversion, in which case a third signal converter may not be necessary.

With continued reference to FIG. 1, signals can be sent from downstream ports 122, 124, and 126 to the storage switch 138 via the communications hub 134. Downstream port signals intended for one of the upstream ports 110, 112, and 114 are routed through the communications hub 134 to the second upstream switch 138. The second upstream switch 132 can route a downstream port signal to either upstream port 114 or signal converter 130 depending on whether the downstream port signal is intended for upstream port 114 or for one of upstream ports 110, 112. In an exemplary embodiment, a downstream port signal intended for one of the Thunderbolt™ upstream ports 110 or 112 can be converted from a USB signal standard to a PCIe signal standard at signal converter 130. The converted signal can then be routed to the appropriate upstream port 110 or 112 via the first upstream port switch 128. In this way, upstream signals and downstream signals routed through communications hub 134 can be made compatible to communicate with host devices 104, 106 connected to Thunderbolt™ type upstream ports 110, 112, a host device connected to USB B-type upstream port 114, or peripheral devices 116, 118, 120 connected to USB A-type downstream ports 116, 118, 120.

Figure 2:
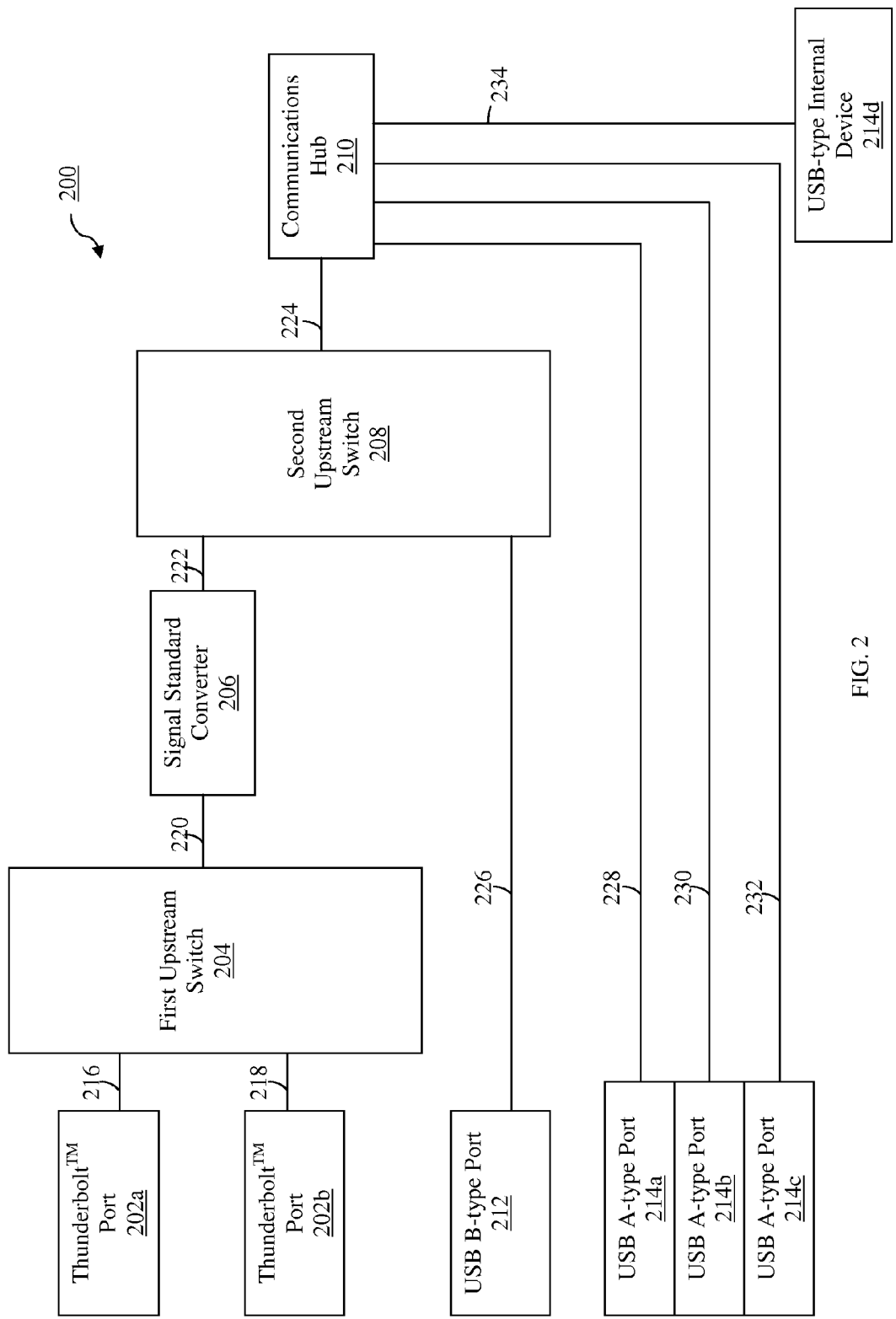
FIG. 2 is a diagram illustrating an exemplary embodiment of upstream ports and downstream ports connected to a communications hub in a multiple interface device.

FIG. 2 is a diagram illustrating an exemplary embodiment of upstream ports 202a, 202b, 212 and downstream ports 214a, 214b, 214c, 214d connected via a communications hub 210 in a multiple interface device 200. As illustrated in FIG. 2, two different types of upstream ports can be included in the multiple interface device 200. In an exemplary embodiment, the multiple interface device 200 can include two upstream ports 202a, 202b of a first type and one upstream port 212 of a second type. For example, the first upstream port type can include a Thunderbolt™ type port and the second upstream port type can include a USB B-type port. In an exemplary embodiment, both the Thunderbolt™ type upstream ports 202a and 202b and the USB B-type upstream port 212 can communicate with downstream ports 214a, 214b, 214c, and 214d via communications hub 210. In an exemplary embodiment, downstream ports 214a, 214b, and 214c can each be a USB A-type port and downstream port 214d can be connected to an internal USB-type device (not shown in FIG. 2). For example, the internal USB-type device (not shown in FIG. 2) can be an internal hard drive.

With further reference to FIG. 2, each of the Thunderbolt™ upstream ports 202a and 202b are coupled to a first upstream switch 204 via respective signal lines 216 and 218. First upstream switch 204 can be a 2:1 multiplexer that selects either input line 216 or 218 for sending upstream signals to the signal standard converter 206 via signal line 220. The signal standard converter 206 can convert upstream signals received from the first upstream switch 204 via signal line 220 from a peripheral component interconnect express (PCIe) standard to a universal serial bus (USB) standard. In an exemplary embodiment, the signal standard converter can be a USB extensible host controller interface (xHCI). The converted upstream signals can then be sent through the second upstream switch 208 to the communications hub 210. Communications hub 210 can route the upstream port signal received via signal line 224 to one of the downstream ports 214a, 214b, 214c, 214d via signal lines 228, 230, 232, or 234, respectively. In an exemplary embodiment, downstream ports 214a, 214b, and 214c can be USB A-type ports each configured to connect to an external peripheral device (not shown in FIG. 2) and downstream port 214d can be configured to connect to an internal USB-type device (not shown in FIG. 2). Still referring to FIG. 2, signals can be routed between the USB B-type upstream port 212 and the USB A-type downstream ports 214a, 214b, 214c, 214d via the second upstream switch 208 and communications hub 210. In an exemplary embodiment, these signals may not need to be converted to a different signal standard since the USB B-type upstream port 212 and the USB A-type downstream ports 214a, 214b, 214c, 214d communicate using the same signal standard.

Referring to FIG. 2, downstream port signals can be routed from one of the USB A-type downstream ports 214a, 214b, 214c, 214d to one of the upstream ports 202a, 202b, 212 via the communications hub 210 to the second upstream switch 208. The second upstream switch 210 can route a downstream port signal to either the USB B-type upstream port 212 or signal standard converter 206 depending on whether the downstream port signal is intended for the USB B-type upstream port 212 or for one of the Thunderbolt™ upstream ports 202a, 202b. In an exemplary embodiment, a downstream port signal intended for one of the Thunderbolt™ upstream ports 202a, 202b can be converted from a USB signal standard to a PCIe signal standard at signal standard converter 206. For example, the signal standard converter 206 can be a USB extensible host controller interface (xHCI). The converted signal can then be routed to the appropriate Thunderbolt™ upstream port 202a, 202b via the first upstream switch 204. In this way, upstream signals and downstream signals routed through communications hub 210 can be made compatible to communicate with host devices (not shown in FIG. 2) connected to Thunderbolt™ type upstream ports 202a, 202b, a host device (not shown in FIG. 2) connected to USB B-type upstream port 212, or peripheral devices (not shown in FIG. 2) connected to USB A-type downstream ports 214a, 214b, 214c.

Figure 3:
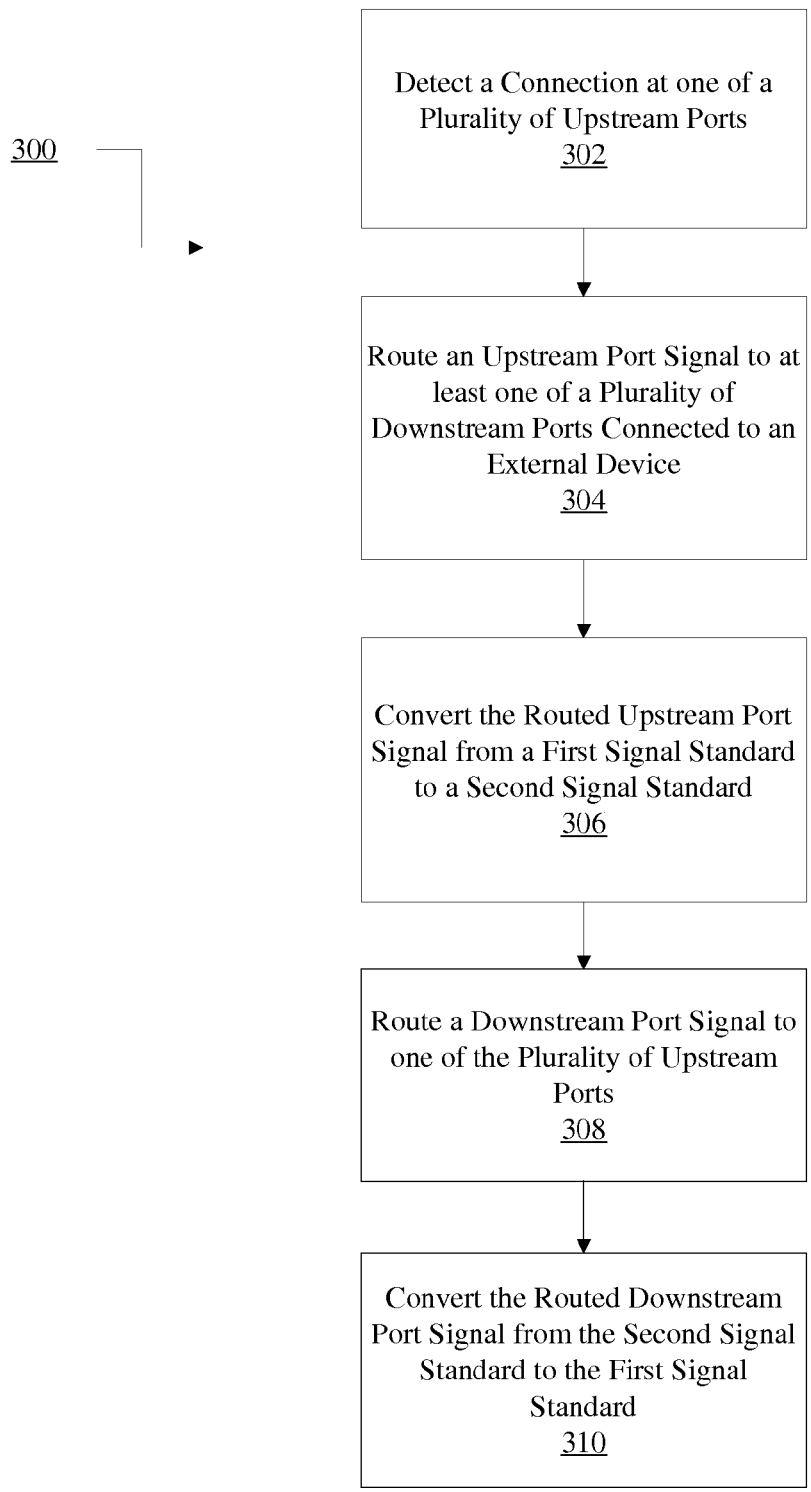
FIG. 3 is a flow chart illustrating an exemplary embodiment for switching between interfaces in a multiple interface device.

FIG. 3 is a flowchart illustrating an exemplary embodiment for switching between interfaces in a multiple interface device as represented by block 300. Each of the steps in the flow chart can be controlled using one or more processors of a computer system or by some other suitable means. As represented by block 302, a connection can be detected at one of a plurality of upstream ports of the multiple interface device. In an exemplary embodiment, the plurality of upstream ports can include one or more Thunderbolt™ type ports and one or more USB B-type ports, and each of the plurality of upstream ports can be configured to connect to a host device. An upstream port signal can be routed to at least one of a plurality of downstream ports connected to an external peripheral device, as represented by block 304. In an exemplary embodiment, each of the plurality of downstream ports can be a USB A-type port. For example, the external peripheral device connected to the at least one downstream port can include a keyboard, a mouse, a laptop computer, a personal computer (PC), a smart phone, a tablet device, a personal digital assistant, or a compound device. As represented by block 306, the routed upstream port signal can be converted from a first signal standard to a second signal standard. In an exemplary embodiment, the upstream port signal can be converted from a PCIe signal standard to a USB signal standard using a signal converter such as a USB extensible host controller interface (xHCI). As represented by block 308, a downstream port signal can be routed from a downstream port to one of the plurality of upstream ports. In an exemplary embodiment, the downstream port signal can be routed from a USB A-type downstream port to a Thunderbolt™ type upstream port via a USB extensible host controller interface (xHCI). As represented by block 310, the routed downstream port signal can be converted from the second signal standard to the first signal standard. In an exemplary embodiment, the downstream port signal can be converted from the USB signal standard to the PCIe signal standard using a signal converter such as the xHCI. Alternately, the downstream port signal can be routed from a USB A-type downstream port to a USB B-type upstream port via a USB B-type interface. In this way, upstream signals and downstream signals routed through a communications hub can be made compatible to communicate with host devices connected to Thunderbolt™ type upstream ports, a host device connected to USB B-type upstream port, or peripheral devices connected to USB A-type downstream ports.

The various aspects of this disclosure are provided to enable one of ordinary skill in the art to practice the present disclosure. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A multiple data type interface device, comprising:
a plurality of upstream ports, wherein at least two of the upstream ports are of a different type;
a plurality of downstream ports, wherein at least one of the plurality of downstream ports is configured to connect to a first external device; and
one or more processors configured to:
detect that a second external device is connected to one of the plurality of upstream ports; and
route an upstream port signal associated with the one of the plurality of upstream ports to the at least one of the plurality of downstream ports configured to connect to the first external device in response to determining that the second external device is connected to the one of the plurality of upstream ports.

2. The device of claim 1, wherein the one or more processors are further configured to convert the routed upstream port signal from a first signal standard to a second signal standard.

3. The device of claim 2, wherein:
the first signal standard comprises a peripheral component interconnect express (PCIe) standard; and
the second signal standard comprises a universal serial bus (USB) standard.

4. The device of claim 3, wherein the one or more processors are further configured to route a downstream port signal associated with one of the plurality of downstream ports to the one of the plurality of upstream ports.

5. The device of claim 4, wherein the one or more processors are further configured to convert the routed downstream port signal from the USB standard to the PCIe standard.

6. The device of claim 4, wherein the one or more processors are further configured to route the upstream port signal and the downstream port signal through one of a universal serial bus (USB) B-type interface or a USB extensible host controller interface (xHCI).

7. The device of claim 6, wherein the one or more processors are further configured to route the upstream port signal through the USB B-type interface in response to determining that the one of the plurality of upstream ports comprises a USB B-type compatible port.

8. The device of claim 7, wherein the one or more processors are further configured to route the upstream port signal through the xHCI in response to determining that the one of the plurality of upstream ports comprises a PCIe compatible port.

9. The device of claim 8, wherein the plurality of downstream ports comprise a plurality of USB A-type compatible ports.

10. The device of claim 3, further comprising at least one internal storage device, wherein the one or more processors are further configured to:
route a second upstream port signal associated with one of the plurality of upstream ports to the at least one internal storage device; and
convert the routed second upstream port signal from the PCIe standard to a third signal standard.

11. The device of claim 10, wherein the third signal standard comprises an external serial advanced technology attachment (eSATA) standard.

12. The device of claim 1, further comprising an external hard drive.

13. A method for switching between interfaces of a multiple data type interface device, the method comprising:
detecting a connection at one of a plurality of upstream ports, wherein:
at least two of the plurality of upstream ports are of a different type; and
the one of the plurality upstream ports is configured to connect to
a first external device; and
routing an upstream port signal associated with the one of the plurality of upstream ports to at least one of a plurality of downstream ports connected to a second external device.

14. The method of claim 13, further comprising converting the routed upstream port signal from a first signal standard to a second signal standard.

15. The method of claim 14, wherein:
the first signal standard comprises a peripheral component interconnect express (PCIe) standard; and
the second signal standard comprises a universal serial bus (USB) standard.

16. The method of claim 15, further comprising routing a downstream port signal associated with one of the plurality of downstream ports to the one of the plurality of upstream ports.

17. The method of claim 16, further comprising converting the routed downstream port signal from the USB standard to the PCIe standard.

18. The method of claim 16, further comprising routing the upstream port signal and the downstream port signal through one of a universal serial bus (USB) B-type interface or a USB extensible host controller interface (xHCI).

19. The method of claim 18, further comprising routing the upstream port signal through the USB B-type interface in response to determining that the one of the plurality of upstream ports comprises a USB B-type compatible port.

20. The method of claim 19, further comprising routing the upstream port signal through the xHCI in response to determining that the one of the plurality of upstream ports comprises a PCIe compatible port.

21. The method of claim 20, wherein the plurality of downstream ports comprise a plurality of USB A-type compatible ports.

22. The method of claim 15, further comprising:
routing a second upstream port signal associated with one of the plurality of upstream ports to at least one internal storage device; and
converting the routed second upstream port signal from the PCIe standard to a third signal standard.

23. The method of claim 22, wherein the third signal standard comprises an external serial advanced technology attachment (eSATA) standard.

24. The method of claim 13, wherein the multiple data type interface device comprises an external hard drive.

* * * * *